May 8, 1962 J. H. TWEET 3,032,984
ROCKET PUMP STARTING SYSTEM
Filed May 12, 1959
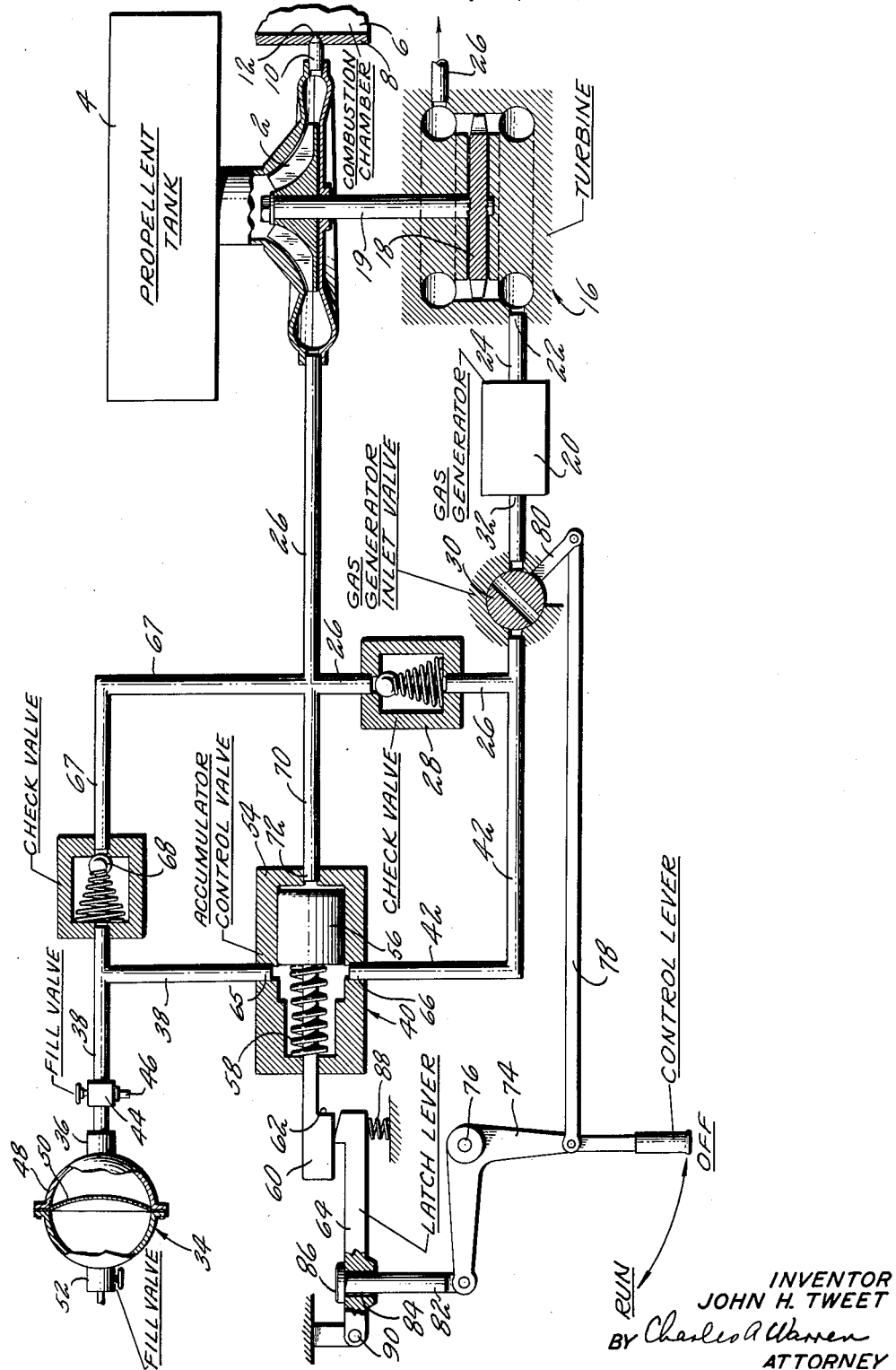
INVENTOR
JOHN H. TWEET
BY Charles A. Warren
ATTORNEY

United States Patent Office 3,032,984
Patented May 8, 1962

3,032,984
ROCKET PUMP STARTING SYSTEM
John H. Tweet, Tolland, Conn., assignor to United Aircraft Corporation, East Hartford, Conn., a corporation of Delaware
Filed May 12, 1959, Ser. No. 812,604
6 Claims. (Cl. 60—39.14)

This invention relates to a starting system for a liquid fuel rocket. One feature of the invention is a starting system which will automatically shut off after the main fuel system is operating. Another feature is an arrangement for recharging the starting system from the main rocket fuel system.

One feature of the invention is a system for setting in operation a pump for the main rocket fuel system with an arrangement by which to cut off automatically the starting system and at the same time to supply fuel from the main system for continuing the pump operation.

Other features and advantages will be apparent from the specification and claims, and from the accompanying drawing which illustrates an embodiment of the invention.

The single figure is a diagrammatic arrangement of the starting system.

The starting system is intended for setting in operation a pump 2 which delivers fuel from a propellant tank 4 to a combustion chamber 6, the latter being schematically represented by a portion of the combustion chamber wall 8. A fuel conduit 10 extends from the pump 2 to a nozzle 12 in the wall of the combustion chamber.

The pump 2 is driven by a gas turbine 16 which includes a rotor 18 connected as by a shaft 19 to the pump. The turbine is driven by hot gas under pressure from a gas generator 20 in the form of a chamber in which fluid delivered thereto decomposes or burns to produce the power gas for the turbine. The turbine has an inlet 22 connected as by a conduit 24 to the gas generator and also has an exhaust conduit 26.

In normal operation, the gas generator 20 is supplied with fluid from the pump 2 through a delivery conduit 26 past a check valve 28 and past a manually controlled inlet valve 30 to the inlet 32 of the gas generator. The valve 30 is shown in the off position. In normal running position the valve 30 is opened for a flow of fluid therethrough to the gas generator.

The starting system has an accumulator 34 the discharge port 36 of which is connected by a conduit 38 through an accumulator valve 40 and another conduit 42 to the valve 30. The accumulator has a filling valve 44 by which propellant fluid from an outside source represented by an inlet conduit 46 may be admitted to the accumulator. The accumulator is of conventional construction and may be in the form of a sphere 48 having a flexible diaphragm 50 thereacross so that the fuel may fill one part of the sphere on one side of the diaphragm and a pressurizing fluid may fill the sphere on the other side of the diaphragm as by a second fill valve 52. With the side of the sphere to the left of the diaphragm 50 under a predetermined gaseous pressure it will be understood that when the valve 30 is opened the propellant fluid from the part of the sphere to the right of the diaphragm will be delivered through the conduits 38 and 42 to the gas generator 20.

The valve 40 includes a casing 54 having a plunger 56 slidable therein and normally urged into the position shown by a spring 58. The plunger also carries a stem 60 having a shoulder 62 engageable with a pivoted latch 64 when the plunger 56 is moved to the left to cut off flow between the ports 65 and 66 in the casing 54, these ports being connected respectively to the conduits 38 and 42. The conduit 38 is connected to conduit 26 as by a conduit 67 having a check valve 68 therein to prevent the flow of fluid toward the pump 2. The conduit 26 is also connected by a conduit 70 to a port 72 at the end of the plunger 56 so that this plunger is moved in response to pressure developing in the propellant pump.

The starting system may be under the control of a lever 74 pivoted as at 76 and having a link 78 connected to the arm 80 on the valve 30. The lever 74 also has attached thereto a rod 82 slidable in a bore 84 in the lever 64 and carries an enlarged head 86 to limit the movement of the latch with respect to the rod 82. A spring 88 normally urges the latch 64 in a direction for operative engagement with the shoulder 62 the latch being mounted on a pivot pin 90.

In operation, the accumulator is pressurized and the starting system is ready for operation, the control lever being in the off position shown so that the valve 30 is closed. The plunger 56 is in the position shown. By movement of the lever 74 into the "run" position the valve 30 is opened and the head 86 of rod 82 is moved away from the latch so that the latter may be moved by spring 88, when the opportunity presents, into engagement with the shoulder 62.

Pressure fluid from the accumulator moves through conduits 38 and 42 and past valve 30 into the gas generator 20 where it decomposes or combusts to produce hot gas under pressure. This hot gas flowing through the turbine starts the operation of the turbine and accordingly, sets the propellant pump 2 in operation thereby delivering fuel under pressure to the main combustion chamber 6. This pump also delivers propellant under pressure through the conduit 26 and past valve 28 to the valve 30 so that when the pump 2 reaches normal operation a flow of propellant through this conduit will leave the generator 20 and will provide power gas for the turbine. As the pressure builds up in the conduit 26 the plunger 56 is moved to the left by this pressure to discontinue the supply of propellant from the accumulator to the gas generator, the plunger 56 carries the valve stem 60 to the left so that the latch 64 becomes operative to retain the plunger 56 in a position to close the ports 65 and 66. When this occurs pressure through conduits 26 and 67 passes through the check valve 68 and replenishes the supply of propellant in the accumulator 34 in readiness for the next starting cycle.

The control lever 74 remains in the running position during the entire operation of the rocket to which this starting system is attached. The rocket operation is discontinued by moving the control lever to off position thereby closing valve 30 to cut off the supply of propellant for the turbine. The return of the lever 74 to off position disengages the latch 64 so that the plunger 56 returns to the position shown for the next starting cycle.

It is to be understood that the invention is not limited to the specific embodiment herein illustrated and described, but may be used in other ways without departure from its spirit as defined by the following claims.

I claim:
1. A starting system for a liquid fuel rocket including a source of propellant, a pump for delivering propellant from said source to a combustion chamber, a turbine for driving said pump and a gas generator connected to said turbine, said starting system including an auxiliary source of fuel under pressure, a connection from said auxiliary source to said gas generator, an inlet valve in said connection and a control valve also in said connection and upstream of said inlet valve, a duct from said pump to said connection between said valves, a latch normally holding said control valve closed, a spring normally urging said control valve into open position, a plunger on said control valve, a connection from said pump to said plunger for moving said control valve into closed position in response to pressure from said pump, and means for operating said inlet valve.

2. A starting system for a liquid fuel rocket including a source of propellant, a pump for delivering propellant from said source to a combustion chamber, a turbine for driving said pump and a gas generator connected to said turbine, said starting system including an auxiliary source of fuel under pressure, a connection from said auxiliary source to said gas generator and an inlet valve in said connection and a control valve also in said connection and upstream of said inlet valve, a duct from said pump to said connection between said valves, a latch normally holding said control valve closed, a spring normally urging said control valve into open position, a plunger on said control valve, a connection from said pump to said plunger for moving said control valve into closed position in response to pressure from said pump and means for disengaging said latch and simultaneously closing said inlet valve.

3. A starting system for a liquid fuel rocket including a source of propellant, a pump for delivering propellant from said source to a combustion chamber, a turbine for driving said pump and a gas generator connected to said turbine, said starting system including an auxiliary source of fuel under pressure, a connection from said auxiliary source to said gas generator and an inlet valve in said connection and a control valve also in said connection and upstream of said inlet valve, a duct from said pump to said connection between said valves, a latch normally holding said control valve closed, a spring normally urging said control valve into open position, a plunger on said control valve, a connection from said pump to said plunger for moving said control valve into closed position in response to pressure from said pump and a duct from said pump to said auxiliary source for recharging said source when the pump is operating.

4. A starting system for a liquid fuel rocket including a main propellant source, a pump for delivering propellant from said source to a combustion chamber, a turbine driving said pump, means for starting said turbine including an auxiliary source of propellant under pressure, a gas generator having an inlet and an outlet, its outlet being connected to said turbine, a connection from said inlet to the said auxiliary source, a control valve in said connection, for cutting off the flow from said auxiliary source to said generator a bypass connection from said pump to said connection upstream of said valve, said bypass having a check valve therein to prevent flow through said bypass in a direction toward the pump so that the auxiliary source may be recharged from said pump, and a bypass from said pump to said connection downstream of the control valve for supplying propellant from said pump to said generator.

5. A starting system for a liquid fuel rocket including a propellant source, a pump for delivering propellant from said source to a combustion chamber, a turbine for said pump and a gas generator for delivering power gas to said turbine, said system including an auxiliary source of fuel under pressure, a connection from said auxiliary source to said gas generator, an inlet valve in said connection, a duct from said pump to said connection upstream of said inlet valve, said duct having a check valve to prevent fluid flow toward the pump in said duct, a control means for operating said inlet valve, a control valve located in said connection upstream of said duct to close said connection, said control valve including a plunger, and a connection from said plunger to said pump such that the plunger is movable into connection closing position in response to pressure from said pump, and a latch connected to and movable with said control means and engaging with a part of said control valve for normally holding said control valve closed.

6. A starting system as in claim 5 wherein the inlet valve connected to said control means is held open by said control means when said latch is normally holding said control valve closed, said control means functioning to disengage the latch and simultaneously close the inlet valve.

References Cited in the file of this patent

UNITED STATES PATENTS

| | | |
|---|---|---|
| 2,551,229 | Alford et al. | May 1, 1951 |
| 2,582,848 | Price | Jan. 15, 1952 |
| 2,714,803 | Abild | Aug. 9, 1955 |
| 2,738,648 | Ogle | Mar. 20, 1956 |
| 2,785,532 | Kretschmer | Mar 19, 1957 |
| 2,858,672 | Clark | Nov. 4, 1958 |